INVENTOR:
SAM P. COOK
BY: *Theodore E. Bieber*
HIS ATTORNEY

United States Patent Office 3,484,739
Patented Dec. 16, 1969

3,484,739
OPTICAL ACOUSTIC SEISMIC MODEL
Sam P. Cook, Irving, Tex., assignor to Shell Oil Company, New York, N.Y., a corporation of Delaware
Filed Sept. 8, 1967, Ser. No. 666,445
Int. Cl. G01v 1/00
U.S. Cl. 340—15.5      3 Claims

ABSTRACT OF THE DISCLOSURE

A process for forming a three-dimensional display of a structure within an opaque solid material wherein the solid is irradiated with acoustic waves that are reflected, refracted and scattered from the structure within the solid. The reflected, refracted and scattered waves are received and converted to related electrical signals at an areal array of receivers. The electrical signals are compressed and reversed and then used to excite a plurality of transducers disposed on the surface of a transparent model of the opaque material. The pattern of refractive indices within the model are converted to a visible pattern of light that may be viewed or recorded.

BACKGROUND OF THE INVENTION

One method employed in exploration for petroleum deposits has been the seismic method in which seismic waves are generated at a point near the earth's surface and then travel downwardly to the various formations. The seismic waves are reflected and refracted from various scattering points and interfaces between various formations. The reflected and refracted waves are received at the earth's surface at a plurality of geophones that are disposed in an areal array with the geophones converting the received waves to related electrical signals that are recorded in a reproducible form.

The recorded seismic signals are then corrected for various factors, such as weathering, but are left uncorrected for moveout. The seismic signals are preferably also filtered to improve their signal-to-noise ratio, the final signals being re-recorded in a two-dimensional display.

While much information regarding the geology and other features of the earth formations can be obtained from an inspection of the two-dimensional display of the seismic signals, additional information could be obtained if the seismic signals were displayed in a three-dimensional array. More particularly, if the seismic signals could be used to reconstruct a three-dimensional model of the reflective and refractive structures within the earth formations, interpretation of the seismic signals and the earth formations would be greatly simplified.

While various attempts have been made to reconstruct three-dimensional models of the earth from the seismic data, the models have been based on interpretations of two-dimensional sections and have not utilized combined representations of the information obtained by an areal array of seismic receivers.

BRIEF DESCRIPTION OF THE INVENTION

The present invention utilizes the data from an areal array by providing a three-dimensional model of the earth formation in which the seismic data may be displayed. More particularly, the invention utilizes a three-dimensional model formed of an optically transparent material, as for example, a fused quartz or lithium niobate material or a body of a liquid such as water, oil, etc. Small transducers are placed on the surface of the model with the transducers being disposed in the same areal distribution as an array of seismic receiver locations. The received seismic data is compressed in time and reversed in time and the resulting signals are applied to the transducers on the model. The transducers induce a pattern of collapsing wavefronts within the model corresponding to those of the original reflected, refracted seismic waves.

The pattern of variations in index of refraction in the model is converted to a visible display. This can be done by, for example, passing the light from a laser source through the model, mixing the transmitted light with a reference beam and producing a photographic transparency of the mixture. This provides a holograph type of transparency which can then be observed in coherent, monochromatic light by following normal holographic techniques. The hologram will provide a visible three-dimensional display of the acoustically reflective and refractive structure in the portion of the earth formation surveyed by the seismic waves.

BRIEF DESCRIPTION OF THE DRAWINGS

The above objects and advantages to this invention will be more easily understood from the following detailed description when taken in conjunction with the attached drawings in which.

DESCRIPTION OF A PREFERRED EMBODIMENT

The present invention is directed to seismic signal-processing problems and more particularly to displaying seismic data in a three-dimensional form. The invention models seismic waves in such a way as to cause them to collapse to their apparent sources, which are either scattering points or the images of the shot point in the effective planes of reflecting surfaces. The displayed seismic waves are preferably converted to a visible image by the application of holography, and the hologram or the hologram-produced image is recorded and, if desired, may be re-corded in an animated form.

The invention utilizes conventional seismic data that has been obtained by generating a seismic disturbance and recording the reflected and refracted seismic waves. The invention assumes that the geophones have been disposed in a pattern on the ground to record the information conveyed by the reflected and refracted seismic waves. The reflected and refracted seismic waves must be recorded so that they can be replayed backwards in time and in addition compressed in time.

As explained above, the seismic waves are recreated within a transparent model with the model being scaled to dimensions in proportion to the ratio of the acoustic wave lengths in the model to the seismic wave lengths in the earth. The model scaling will depend upon the acoustic velocity in the model and the frequency multiplication of the playback process. In order to scale the geological section to a convenient size, the acoustic wave lengths must be shortened in the model by speeding up the playback. If one assumes that a convenient model size is approximately a 100-millimeter cube and such a model is to represent $10^6$ cm. or 10 km., a scaling factor of $10^5$ is involved. This scaling factor will produce frequencies of $10^5$ to $10^7$ Hz. in the model that correspond to a seismic band of 1 to 100 Hz. Although many materials, including water, may serve as a modeling medium, amorphous quartz is preferred, since for quartz, wide band transducers can be matched over a wide range of frequencies. In addition, quartz has the advantage of having an acoustic velocity approximately the same as the seismic velocities in the earth.

The originally field recorded seismic data should have the normal corrections applied, except in respect to moveout. The processed seismic data is compressed by speeding up the playback to obtain the compressional modeling factor and the scaling factor set forth above and then played back in reverse direction.

Figure 1:
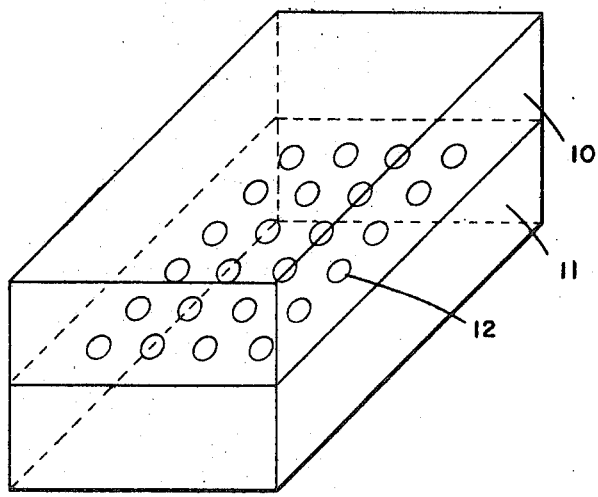
FIGURE 1 is a perspective view of the quartz model used in this invention.

Referring now to FIGURE 1 there is shown a block of amorphous quartz used for the modeling medium. The geometrical dimensions of the block 10 should be larger than the scaled region of interest, for example, if one utilizes the figures above wherein it was assumed that a scaling factor of $10^5$ was involved, a quartz block 100 mm. on a side would represent a full-scale dimension of 10 km. Attached to the quartz model are a series of transducers 12 that are disposed in the same geometrical pattern in which the original geophones were disposed. The transducers generate collapsing wavefronts which converge at the model points corresponding to the image points of the shot point in the reflecting planes. At these points the acoustic waves will be coherently superimposed and will form a maximum in the refractive index perturbation, as a result of the Debye-Sears effect.

To obtain mechanical impedance matching it is preferable that the transducers 12 be disposed in a sandwich between two quartz blocks 10 and 11.

Each of the transducers is driven by a suitably amplified electrical signal derived from the recording of its respective geophone. As explained, these signals are compressed in time by the scaling factor and, in addition, reversed in time. Thus, the transducers will produce signals which will form collapsing wavefronts in the quartz model, instead of the expanding wavefronts that would be formed by driving them with the geophone signal as it was received in the field. While the quartz model is a homogeneous material and thus will not have the velocity variations actually exhibited by the earth, it will tend to have the same geometrical distortion. Of course, the velocity variations can be corrected for after the imaging to the extent that the knowledge of the velocity distribution in the earth is available. The lack of a true velocity match between the model and the earth will have a slight effect on the phase of the various waves as they converge at the various acoustical foci.

The transducers 12 can be simple electromechanical transducers capable of being driven by an electrical signal to produce a resulting mechanical vibration. In some cases, it may be physically impossible to provide sufficient room on the quartz model to locate a sufficient number of transducers corresponding to the geophones in the original seismic array. Under such circumstances the transducers can be remotely mounted and then coupled to the appropriate position on the quartz model by suitable means.

Figure 2:
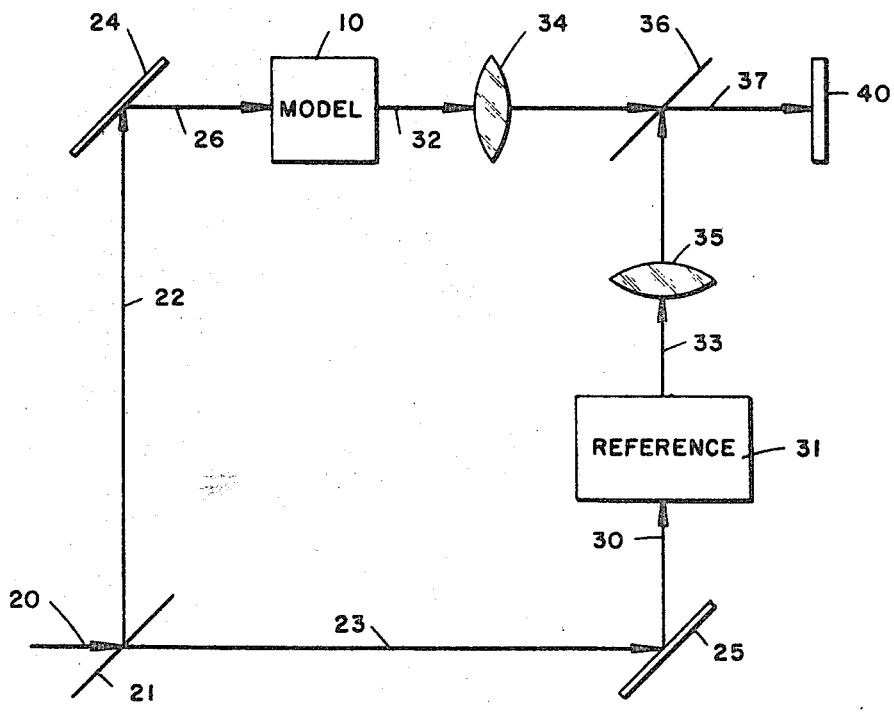
FIGURE 2 is a block diagram form of one means by which the pattern of charges in the quartz model may be converted to a visible display.

In order to render the wave-fronts generated in the quartz model visible, the surface of interest within the interior of the model is brought to focus on a photographic plate while it is simultaneously illuminated by a uniform reference light beam. As shown in FIGURE 2, a beam of monochromatic light 20, for example from a laser source, is directed onto a beam-splitting device 21. One beam 22 is reflected from a mirror 24 into a beam 26 that passes through the quartz model 10. The other beam 23 from the beam splitter is reflected by a mirror 25 through a reference quartz block 31. The reference quartz block 31 is a plain block identical to the model block 10, but having no acoustic signals recorded therein. If the coherence length of the laser beam is long enough, block 31 can be omitted.

The monochromatic light exits from the quartz model as a beam 32 and from the reference model as a beam 33. The two beams 32 and 33 are focused by means of lenses 34 and 35 onto a beam-splitting device 36 where the two beams are mixed and form a single beam 37 of monochromatic light. The single beam can then be recorded on a film transparency 40.

From the above description it is appreciated that a simple means has been provided by which the distribution of acoustic images within the model have been converted to a holographic type of transparency. The holographic transparency may be observed utilizing conventional holographic techniques. In the alternative the pattern of the acoustic distribution in the model can be rendered visible in an animated form by using a pulsed laser illuminator in order to provide a series of transparencies related to various planes within the model and displaying their images by motion picture techniques to show the collapsing or expanding of the wavefronts. Similarly, a series of holograms can be produced at various times after the starts of the time-reversed seismic signal playouts. When the wave patterns in the model block are observed as the playouts are completed, the image points that are seen are those of the source in the various reflective layers. Observations at other times relative to the playout will reveal points corresponding to diffractive points within the sampled portion of the earth formations.

I claim as my invention:
1. A process for forming a three-dimensional display of a solid material comprising:
   producing acoustic waves in the solid material being investigated;
   disposing an areal array of receiving transducers on the surface of said solid, said receiving transducers receiving the acoustic waves that travel from points within the material, and converting the received waves to related electrical signals;
   compressing the related electrical signals in time to the extent required to adjust their frequencies to those of acoustic waves of wavelengths that are scaled relative to the dimensions of a scaled model of the material being investigated;
   reversing the compressed, related electrical signals in time;
   transducing said compressed and reversed related electrical signals into model acoustic waves that are produced in an optically transparent material that is a scaled model of the material being investigated, the points at which the related electrical signals are transduced being disposed on the model in substantially the same array as the receivers were disposed on the material being investigated; and
   visibly displaying a pattern of light that corresponds to a pattern of refractive indices that is produced in the model by the effect of the model acoustic waves on the optically transparent material, whereby indications are provided of the presence and disposition within the material being investigated of the points of scattering and surfaces of reflection that are responsive to acoustic waves.

2. The process of claim 1 wherein said optically transparent model is formed of quartz and said visible display is formed by directing monochromatic light through the transparent model and mixing the light transmitted through the model with a reference beam and recording the resulting mixture of light.

3. The process of claim 1 wherein said material is an earth formation and said acoustic waves are seismic waves.

References Cited

UNITED STATES PATENTS 400,363   9/1968   Silverman _____ 340—15.5

RODNEY D. BENNETT, Jr., Primary Examiner

CHARLES E. WANDS, Assistant Examiner

U.S. Cl. X.R.

350—3.5